United States Patent [19]

Forgues

[11] 4,329,128

[45] May 11, 1982

[54] PUMP FOR THERMOPLASTIC MATERIALS WITH HEATER MEANS

[75] Inventor: Louis V. Forgues, Lunenburg, Mass.

[73] Assignee: Parks-Cramer Company, Fitchburg, Mass.

[21] Appl. No.: 104,315

[22] Filed: Dec. 17, 1979

[51] Int. Cl.³ .................. F04C 2/18; F04C 15/00; B25F 3/08

[52] U.S. Cl. ................... 418/83; 418/206; 425/379 R

[58] Field of Search .............. 418/83, 205, 206; 425/378 R, 378 S, 379 R, 379 S; 264/40.6; 222/146 H, 146 HE

[56] References Cited

U.S. PATENT DOCUMENTS

| | | | |
|---|---|---|---|
| 3,113,525 | 12/1963 | Mello | 418/83 |
| 3,280,802 | 10/1966 | Froede | 418/83 |
| 3,286,700 | 11/1966 | Froede | 418/83 |
| 3,292,601 | 12/1966 | Bensinger et al. | 418/83 |
| 3,746,481 | 7/1973 | Schippers | 418/83 |
| 3,799,708 | 3/1974 | Leptien | 418/83 |
| 3,837,768 | 9/1974 | Haupt | 418/206 |
| 4,032,391 | 6/1977 | Moked et al. | 418/206 |
| 4,035,112 | 7/1977 | Hackbarth et al. | 418/83 |
| 4,037,998 | 7/1977 | Goloff | 418/83 |

*Primary Examiner*—John J. Vrablik
*Attorney, Agent, or Firm*—Schiller & Pandiscio

[57] ABSTRACT

A gear-type pump for thermoplastic materials including synthetic and natural polymers or resins, the pump including a housing, intermeshing gears disposed in the housing, the housing having an inlet conduit for directing bulk thermoplastic materials to the gears and an outlet conduit for movement of the material from the gears, and heater structure disposed in the housing and proximate the gears and the inlet and outlet conduits to impart heat to the material as the material flows through the pump.

17 Claims, 14 Drawing Figures

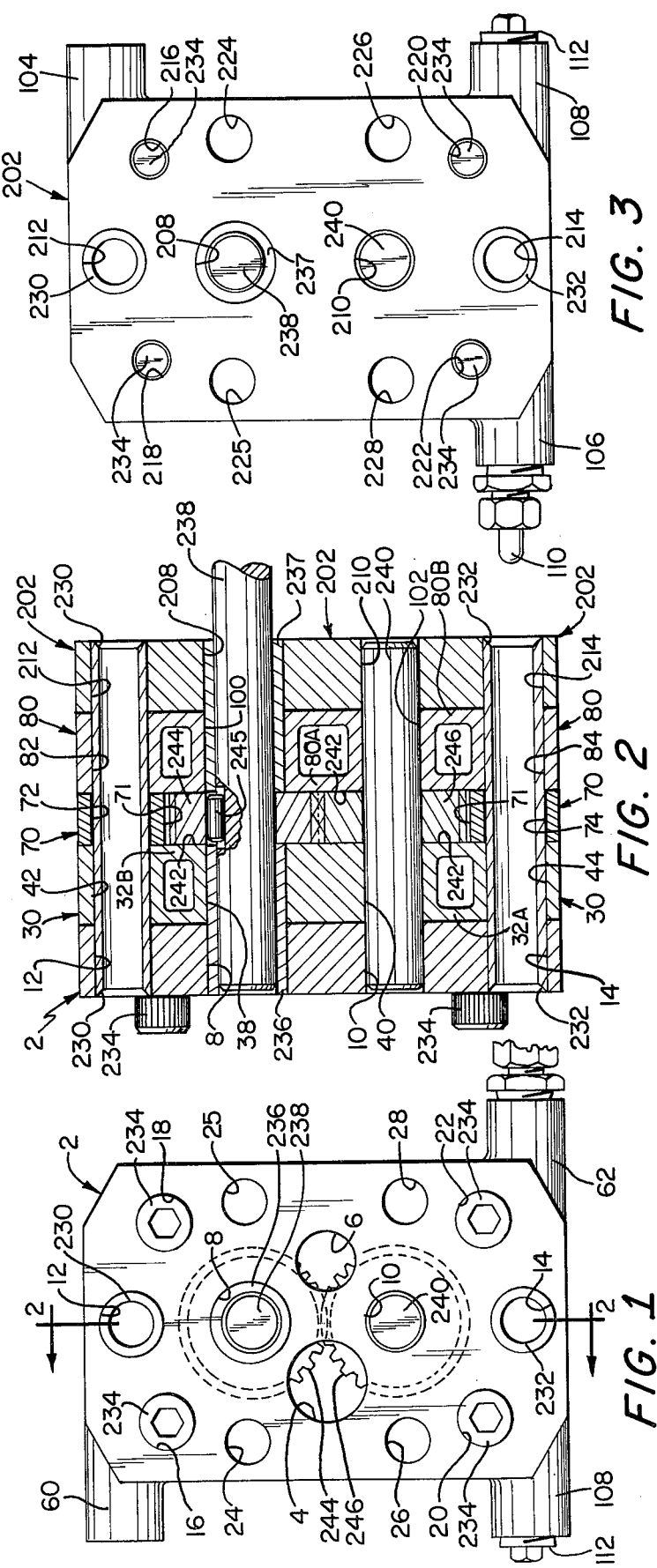

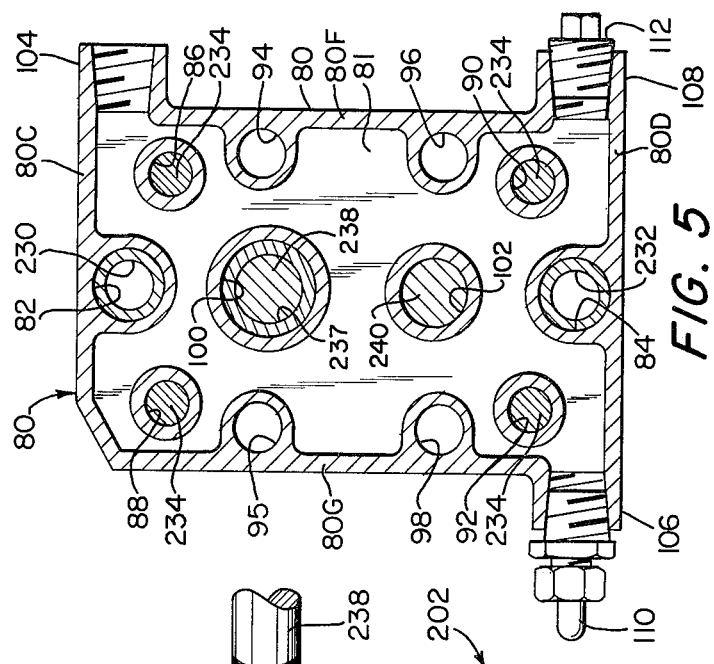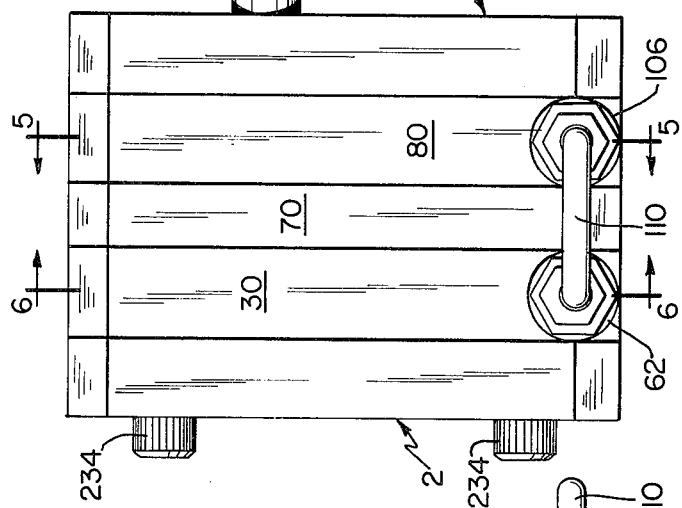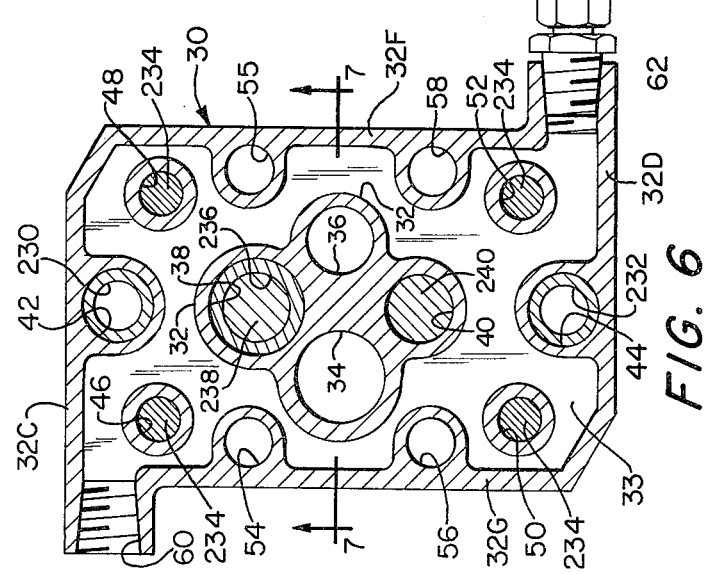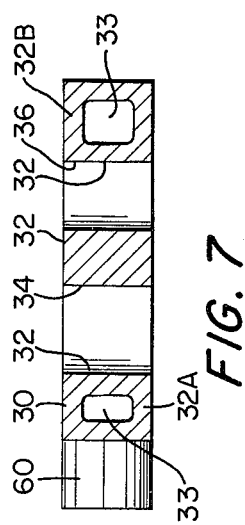

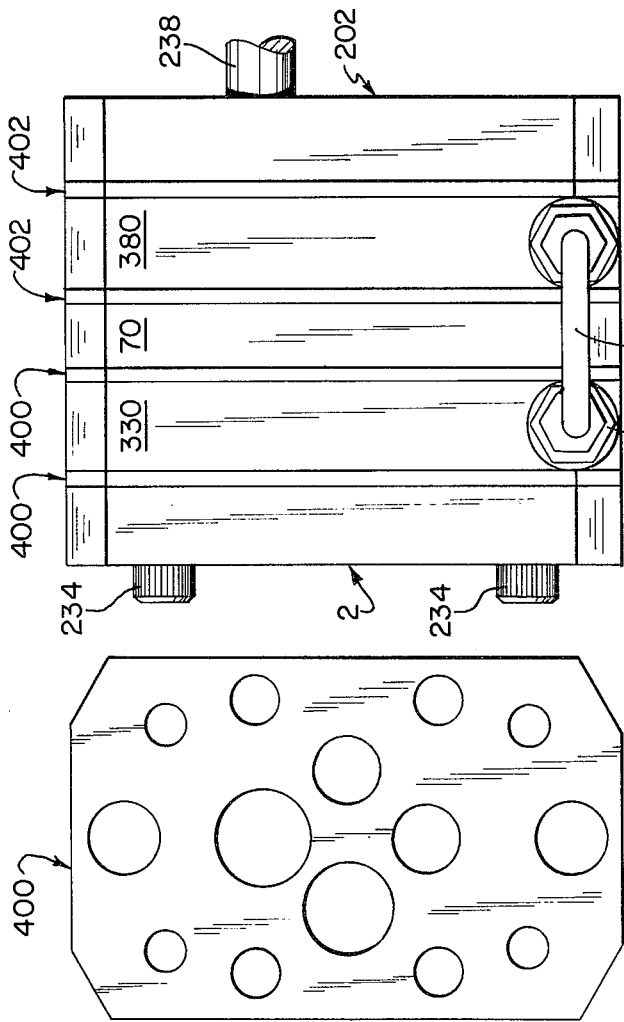
FIG. 11
FIG. 10
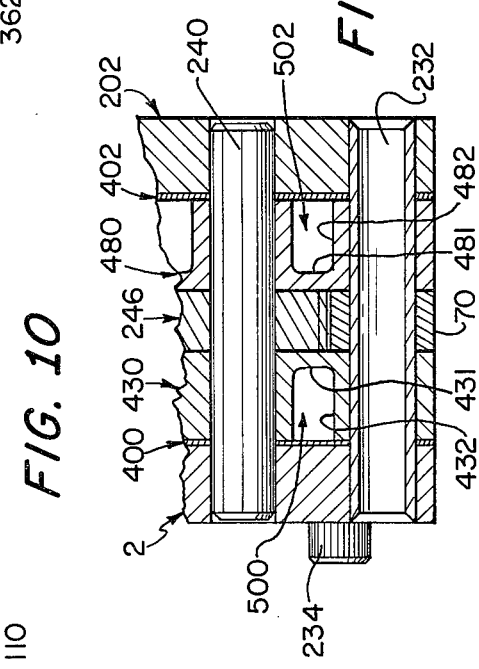
FIG. 12
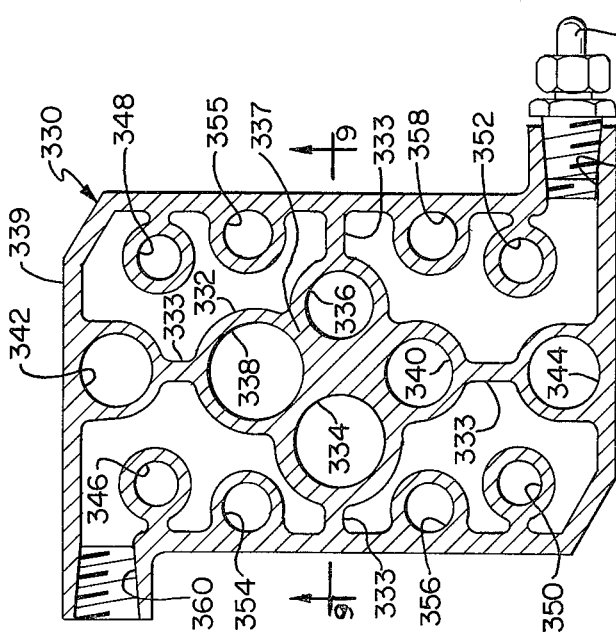
FIG. 8
FIG. 9

PUMP FOR THERMOPLASTIC MATERIALS WITH HEATER MEANS

BACKGROUND OF THE INVENTION

1. Field of the Invention

The invention relates to pump devices, and is directed more particularly to a gear-type pump for bulk thermoplastic materials.

2. Description of the Prior Art

In the production of man-made tow, fiber and film, the starting material, hereinafter referred to as "bulk thermoplastic material", is made fluid, as by melting, extruded through small holes or dies, and then solidified by cooling or chemical treatment. The extrusion is accomplished by the thermoplastic material being forced by a pump through a spinning jet, spinneret, die or casting head.

Pumps for forcing such materials, e.g., nylon, through spinnerets and dies are known in the art and generally comprise a gear-type pump including a housing having an inlet and outlet for the resin material, and intermeshing gears operative to drive the material through the pump and to, and through, the spinneret or dies. Such pumps currently are not provided with self-contained heating means, although it is most beneficial that the thermoplastic material be heated and not allowed to cool during transit through the pump.

In addition to the above services, similar but larger gear-type pumps are used for the mass transfer of thermoplastic and other materials from one point to another. Such pumps, generally known as transfer pumps are subject to the same benefits by the addition of heat.

To alleviate the problem, external heating means are frequently attached to, or applied to, the pumps. The results of such attachments, or outside application of heat, are lacking in uniformity at best and in many cases are, to a large degree, ineffectual or unreliable. They also serve to increase the size (bulk) of the pumps which are frequently used in highly congested areas. In such cases, the only recourse is to heavily insulate the pumps as far as possible which is not usually sufficient to maintain the fluid temperatures desired.

SUMMARY OF THE INVENTION

It is, therefore, an object of the present invention to provide a gear-type pump for bulk thermoplastic materials of the type described, the pump having within its housing, and as an integral part thereof, heating means for imparting heat to the thermoplastic material as the material flows through the pump.

A further object of the invention is to provide such a pump utilizing to the extent possible the same parts as are used presently in the construction of such pumps, so as to minimize manufacturing costs and facilitate interchangeability of parts.

With the above and other objects in view, as will hereinafter appear, a feature of the present invention is the provision of a gear-type pump for bulk thermoplastic materials, the pump including a housing, intermeshing gear means disposed in the housing, the housing having an inlet conduit for directing the thermoplastic material into the housing and to the gear means, and an outlet conduit for movement of the thermoplastic material from the gear means and out of the housing, and heater means disposed in the housing and proximate the gear means and the inlet conduits to impart heat to the thermoplastic material as the material flows through the pump.

The above and other features of the invention, including various novel details of construction and combinations of parts, will now be more particularly described with reference to the accompanying drawings and pointed out in the claims. It is understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown illustrative embodiments of the invention from which its novel features and advantages will be apparent. In the drawings:

FIG. 1 is a front elevational view of a pump illustrative of an embodiment of the invention;

FIG. 2 is a sectional view taken along line 2—2 of FIG. 1;

FIG. 3 is a back elevational view;

FIG. 4 is a side elevational view;

FIG. 5 is a sectional view taken along line 5—5 of FIG. 4;

FIG. 6 is a sectional view taken along line 6—6 of FIG. 4;

FIG. 7 is a sectional view taken along line 7—7 of FIG. 6;

FIG. 8 is a sectional view, similar to FIG. 6, but showing an alternative embodiment of the invention and with portions omitted for clarity;

FIG. 9 is a sectional view taken along line 9—9 of FIG. 8;

FIG. 10 is a front elevational view of a portion of the assembly of the alternative embodiment of FIG. 8;

FIG. 11 is a side elevational view of the alternative embodiment of FIG. 8;

FIG. 12 is a partial sectional view, similar to FIG. 2, but showing another alternative embodiment;

DESCRIPTION OF THE PREFERRED EMBODIMENTS

Figure 13:
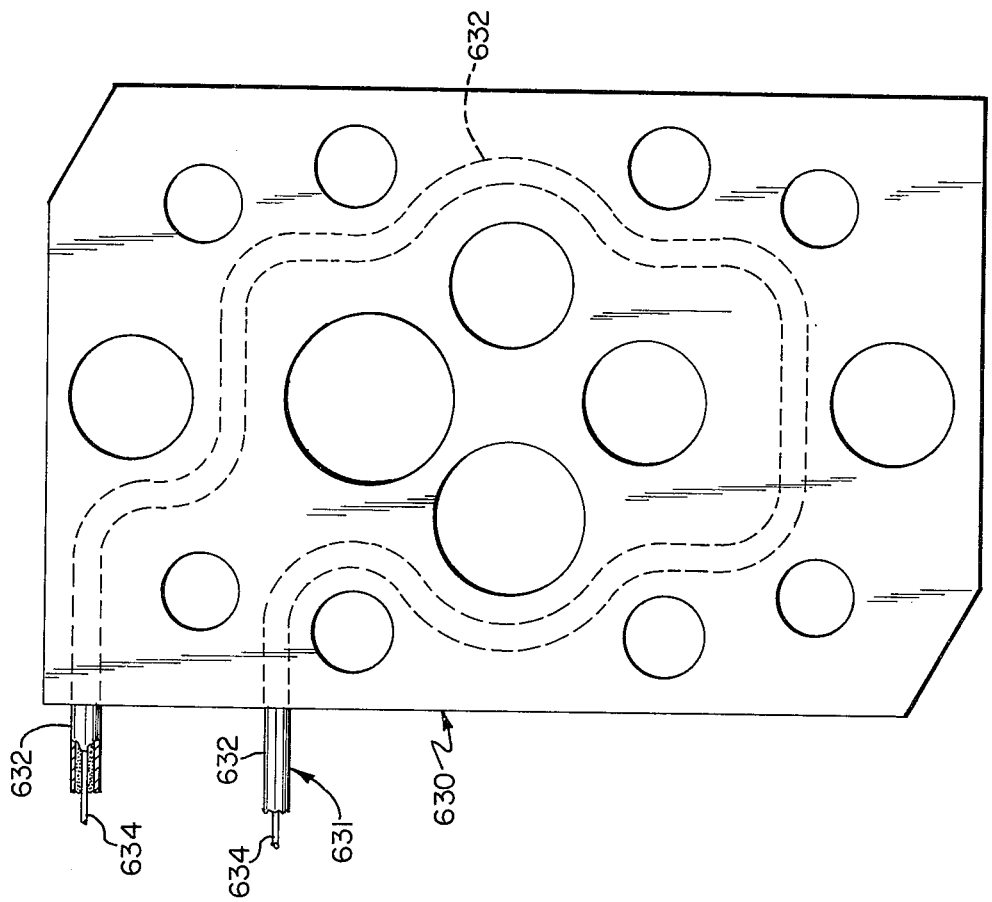
FIG. 13 is an elevational view, similar to FIGS. 6 and 8, but illustrative of still another alternative embodiment of the invention.

Referring to the drawings, and particularly to FIGS. 1, 2 and 4, it will be seen that the illustrative pump includes a front plate 2 provided with an inlet conduit 4 and an outlet conduit 6 to facilitate the flow of thermoplastic material therethrough. The front plate 2 is further provided with bores 8, 10 for receiving shaft members, openings 12, 14 adapted to receive dowel members, holes 16, 18, 20, 22 for receiving binder screws, and mounting holes 24, 25, 26 and 28, all to be further described below. The front plate 2 is preferably of metal, such as steel.

Referring to FIGS. 2, 4, 6 and 7, it will be seen that disposed adjacent the front plate 2 is a first heater plate 30 which is preferably of steel and is substantially hollow. The first heater plate 30 is provided with wall structure 32 comprising front and back walls 32A and 32B and top, bottom and opposite side walls 32C, 32D, 32E and 32F, respectively. The foregoing walls define a chamber 33. The wall structure 32 defines an inlet conduit 34 and an outlet conduit 36 extending through the plate 30. The wall structure 32 further defines channels 38 and 40 for receiving the aforementioned shaft members. Additional wall structure defines openings 42 and 44 for receiving the aforementioned dowel members, and holes 46, 48, 50 and 52 for receiving the aforementioned binder screws. The plate 30 is further provided with wall structure defining mounting holes 54, 55, 56 and 58.

It will be apparent that the front plate inlet conduit 4 is in alignment with the first heater plate inlet conduit 34, and that the front plate outlet conduit 6 is in alignment with the first heater plate outlet conduit 36. In similar manner, the bores 8, 10 and the channels 38, 40 are in respective alignment, as well as the openings 12, 14 and the openings 42, 44, the holes 16, 18, 20, 22 and the holes 46, 48, 50, 52 and the mounting holes 24, 25, 26, 28 and the mounting holes 54, 55, 56 and 58.

The first heater plate 30 is further provided with heating medium conduits 60, 62. Thus, a heating medium, preferably a fluid such as steam, hot water, hot oil, Dowtherm ® or other similar material, may be introduced to the first heater plate by way of the conduit 60, circulate around the chamber 33, imparting heat to the thermoplastic material in the inlet and outlet conduits 34 and 36, and exit from the plate 30 by way of the heating medium conduit 62.

FIGS. 2 and 4 show a center plate 70 which is preferably of steel and is of a collar configuration defining a central opening 71. The center plate 70 is adjacent the first heater plate 30 and is provided with openings 72, 74 in alignment, respectively, with the first heater plate openings 42, 44. The center plate is further provided with appropriate holes (not shown) in alignment with the openings 42, 44, holes 46, 48, 50 and 52 and mounting holes 54, 55, 56 and 58 of the first heater plate 30.

Disposed adjacent the center plate 70 is a second heater plate 80, shown in FIGS. 2, 4 and 5. The second heater plate 80 is substantially hollow and is provided with wall structure comprising front and back walls 80A and 80B and top, bottom and opposite side walls 80C, 80D, 80E and 80F, respectively. The foregoing walls define a chamber 81. The wall structure 80 also defines openings 82, 84 similar to and in respective alignment with the openings 42, 44 of the first heater plate 30, holes 86, 88, 90, 92 in respective alignment with the holes 46, 48, 50, 52, mounting holes 94, 95, 96, 98 similarly aligned with the mounting holes 54, 55, 56, 58 and channels 100 and 102 aligned respectively with the channels 38, 40 of the first heater plate 30. The second heater plate is preferably of steel.

The second heater plate 80 is further provided with heating medium conduits 104, 106 (FIG. 5). An alternative conduit 108 may be provided for further flexibility in use of the heater plates, as will be further discussed below. In the embodiment shown in FIGS. 1–7, the first heater plate conduit 62 and the second heater plate conduit 106 are interconnected by a crossover pipe 110. In such arrangement, the heating fluid which exits from the first heater plate enters chamber 81 of the second heater plate by way of the conduit 106 and exits the second heater plate by way of the conduit 104. The conduits 60, 62, 104, 106 and 108 may be threaded, as shown, to accept connections such as the cross-over pipe 110, or a plug 112, as shown in FIG. 5.

Adjacent the second heater plate 80, there is disposed a back plate 202, preferably of steel, provided with bores 208, 210, openings 212, 214, holes 216, 218, 220, 222, and mounting holes 224, 225, 226, 228 all in alignment with corresponding features of the front plate, and the first and second heater plates, as may be seen in FIGS. 2 and 3.

The aligned openings 12, 42, 72, 82, and 212 receive a hollow first dowel member 230; similarly, the aligned openings 14, 44, 74, 84 and 214 receive a hollow second dowel member 232. The aligned mounting holes 24, 54, 94, 224; 25, 55, 95, 225; 26, 56, 96, 226; and 28, 58, 98, 228; and the dowels 230, 232 are adapted to receive rods (not shown) by which the pump may be securely mounted to a mounting block (not shown). The aligned holes 16, 46, 86, 216; 18, 48, 88, 218; 20, 50, 90, 220; 22, 52, 92, 222 are threaded and adapted to receive binder screws 234 (FIGS. 2 and 4) which operate to hold together the housing comprising the combination of plates 2, 30, 70, 80 and 202. The aligned bores 8, 38 and 100, 208 have disposed therein aligned sleeves 236, 237 which receive a drive shaft 238. In like manner, the aligned bores 10, 40, 102, and 210 have disposed therein a fixed arbor 240.

The first and second heater plates 30, 80, and the center plate 70 define a chamber 242 (FIG. 2) in which are disposed gear means including a drive gear 244 and a slave gear 246. The drive gear 244 is fixed, as by a key 245, on the drive shaft 238 and the slave gear 246 is mounted for free rotation on the arbor 240; the gears 244, 246 being in intermeshing engagement withh each other. The inlet conduits 4, 34 are disposed to direct the thermoplastic material to the chamber 242 in the vicinity of the dynamic engagement of the gears 244, 246. The outlet conduits 6, 36 are disposed to direct the driven thermoplastic material away from the vicinity of the dynamic disengagement of the gears.

It is to be appreciated from the foregoing description that the plates 2, 70, and 202 constitute parts of a conventional pump housing and that plates 30 and 80 are additions to the housing made in accordance with this invention.

In operation, a power means (not shown) rotatively drives the drive shaft 238, thereby causing rotation of the drive gear 244, which in turn causes rotation of the slave gear 246. The rotation of the drive gear 244 and interaction of the gears, draws bulk thermoplastic material through the inlet conduits and forces the material through the outlet conduits toward an appropriate spinneret or die or to further processing machinery or equipment (not shown).

Heating fluid is circulated through the first and second plates 30, 80 to impart heat to the chamber 242 and to the resin inlet and outlet conduits. Thus, the thermoplastic material may be maintained at a desired temperature during its transit through the pump. A preferred arrangement for the heating fluid involves entry of the fluid by way of the conduit 60, movement out the conduit 62 to the cross-over pipe 110 and the second heater plate conduit 106 and thence to the conduit 104 for exiting from the pump. It will be apparent that the path could be reversed, and that each heater plate could be provided with its own independent heating fluid system. Additional conduits, such as the conduit 108 shown in FIG. 5, permit further flexibility as to the selected path for the heating fluid.

The front, center and back plates 2, 70, 202, as well as the gears 244, 245, are interchangeable with pumps of a like nature (but lacking an internal heating means) in current use. The various mounting holes of the heater plates, and dowel members described above, are adapted to cooperate with the front and back plates to receive mounting rods and/or bolts disposed for mounting of the pumps in current use.

In FIGS. 8–11, there is shown an alternative embodiment of the invention in which the first heater plate 30 is replaced by a first heater plate 330 (FIGS. 8 and 9), similar to the first heater plate 30 but comprising, instead of a hollow plate, as shown in FIG. 6, an open lattice member including wall structure 332 defining an inlet conduit 334, an outlet conduit 336, channels 338, 340, openings 342, 344, holes 346, 348, 350, 352, mounting holes 354, 355, 356, 358, and heating medium conduits 360, 362, all arranged and disposed and serving the same functions as like portions described above relative to the first heater plate 30. More particularly, the heater plate 330 differs from the heater plate 30 in that it lacks the front and back walls 32A and 32B of heater plate 30 and has webs 333 which form passageways 335 and also connect the center portion 337 of the wall structure 332 to its peripheral wall portions 339 and yet allow fluid to circulate around the conduits 334 and 336. Passageways 335 allow the heating medium to flow from conduit 360 to conduit 367, or vice versa.

As shown in FIG. 11, the first heater plate 330 is disposed between the front plate 2 and the center plate 70. In the embodiment shown in FIG. 11, however, the first heater plate 330 is bounded on either side by intervening side plates 400. The side plates 440 enclose the first heater plate 330 on the front and rear sides thereof so as to define a chamber similar to chambers 33 and 81 for the passage of the heating medium through the heater plate 330 around the inlet and outlet conduits 334 and 336. The side plates 400 are provided with openings complementary to the openings described in some detail above in the front plates and heater plates. In the embodiment shown in FIG. 11, there is provided a second heater plate 380, which is similar and complementary to the first heater plate 330 and, like the heater plate 330, is bounded on its front and rear sides by a pair of side plates 402 substantially the same in construction and function as the side plates 400, less the resin inlet and outlet openings.

In use of the embodiment of FIGS. 8–11, the heating medium may enter by way of a heating medium conduit, as for example the conduit 360, pass through the chamber formed by the wall structure 332 and the side plates 400, exit the first heater plate 330 by the conduit 362, enter the cross-over pipe 110 and thence pass to the chamber formed by the second heater plate 380 and its side plates 402, substantially as described above relative to the first embodiment.

In FIG. 12, there is shown another alternative embodiment in which first and second heater plates 430, 480 are formed with a wall structure which is intermediate the wall structures of the heater plates 30, 80 and the heater plates 330, 380. More particularly, the plates 430 and 480 are formed with a single side wall 431, 481, which in conjunction with upstanding wall structure 432, 482, defines chambers 500, 502 to accomodate the flow of heating medium. To enclose the chambers 500, 502, the heater plates 430, 480 are used in conjunction with one each of the side plates 400, 402.

Thus, the first and second heater plates may be provided with two walls, thereby comprising an essentially hollow plate (FIGS. 6 and 7); may be formed substantially as a lattice member (FIGS. 8 and 9) and used in conjunction with a pair of side plates; or, may be formed with a single side wall and used in conjunction with a single side plate (FIG. 12). In each instance, the heater plates are adapted to receive and circulate a heating fluid in proximity to the interacting gears and the inlet and outlet conduits.

Figure 14:
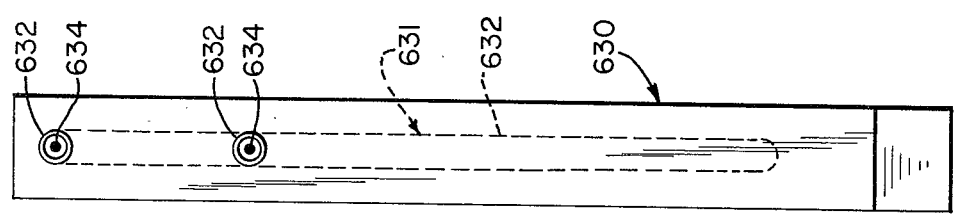
FIG. 14 is a side elevational view of the portion of FIG. 13.

In FIGS. 13 and 14, there is shown still another embodiment of heater plate suitable for use in the present invention. In place of the heater plates above described, there may be used a heater plate 630, preferably of cast aluminum, and having cast therein, an electrical resistance heating element 631 comprising a sheath 632 in which is disposed a resistance wire 634. Although not shown, it is to be understood that the ends of the heating element 61 are adapted to be connected to a suitable source of electrical power. In this embodiment, the flow of electrical current through the wire 634 heats the plate 630, which in turn imparts heat to the gear area and the inlet and outlet conduits.

It is to be understood that the present invention is by no means limited to the particular constructions herein disclosed and/or shown in the drawings, but also comprises any modifications or equivalents within the scope of the disclosure. For example, the first heater plate may be provided with additional heating medium conduits, such as the conduit 108 shown on the second heater plate. Further, metal gaskets may be used between various plate components, but have been omitted from the drawings for clarity. Still further, it will be apparent that the first and second heater plates needn't necessarily be of the same embodiment. The heater plate of FIG. 6 could, for example, be used in conjunction with any of the other embodiments as first and second heater plates, respectively. Also, the side plates 400 and 402 may be omitted when the lattice-type heater plates 330 and 380, or the plates 430 and 480 are used.

It is to be appreciated also that the pump housing need not be generally rectangular as shown in FIG. 1 but may be square or round or have some other suitable shape. Also, as is common in transfer pumps, the inlet and outlet openings for the thermoplastic material may be on opposite sides of the pump rather than on the same side. A further possible modification is to have the inlet and outlet openings disposed at a right angle to each other. Similarly the conduits 60 and 62, for example, could be angulated so as to have their ends extending parallel or at an acute angle to the axes of shafts 238 and 240. It also is obvious that the invention is applicable to multi-stream gear pumps of the type having a common drive shaft, a single inlet and two or more material outlets, and two stream metering pumps having a 3-gear format wherein two gears are mounted symmetrically about a central driving gear. Such pumps are available, for example, from Slack & Parr Ltd., Kegworth, Derby DE7 2GA, England.

While the best performance from a heat transfer viewpoint is achieved when each valve unit has heater plates on both sides of the center plate containing the gears, in many instances it may be possible to utilize only one heater plate for each pump unit, either on one side or the other of the center plate containing the gears, and still maintain the desired temperature level. In such case, the heating fluid connections will be confined to a single heater plate and the need for transfer line 110 is eliminated.

A significant advantage of this invention over the prior art is the high heat transfer capability of the heater plates by conduction for the adjacent pump components, coupled with the fact that the heat loss from said plates by convection is low due to the relatively low surface area of said plates exposed to the surrounding environment. The high heat transfer capability of the heater plates by conduction is enhanced by the lack of air between those plates and the adjoining portions of the pump, i.e., pump housing and gears.

What is claimed is:

1. A gear-type pump for bulk thermoplastic material in fluid form, said pump comprising:
   a front plate having first and second opposite side surfaces and inlet and outlet conduits for passage of thermoplastic material therethrough, said inlet and outlet conduits each extending between and terminating at said first and second opposite side surfaces;
   a first heater plate disposed adjacent and parallel to said front plate, said first heater plate having opposite side surfaces and inlet and outlet conduits extending between its said side surfaces in aligned and communicating relation with said front plate inlet and outlet conduits respectively;
   a center plate with a hole therein disposed adjacent and parallel to said first heater plate;
   a second heater plate disposed adjacent and parallel to said center plate;
   said first and second heater plates and said center plate hole defining a chamber having an inlet and an outlet formed by the inlet and outlet conduits respectively of said first heater plate;
   intermeshing gears disposed in said chamber and adapted to receive said thermoplastic material introduced at said chamber inlet and drive said material out of said chamber via said chamber outlet, said gears being disposed for rotation on axes extending at a right angle to the plane of said center plate;
   a back plate disposed adjacent and parallel to said second heater plate; and
   means urging said front and back plates toward each other so as to clamp said heater plates and said center plate therebetween in fluid sealing relation to one another;
   said heater plates being provided with means for providing heat to said plates, said gears and said thermoplastic material in said chamber and said inlet and outlet conduits.

2. A pump according to claim 1 in which each of said heater plates comprises a heat conductive plate having electrical heating means fixed thereto.

3. A pump according to claim 1 in which each of said heater plates comprises a substantially hollow plate having inlet and outlet means for a heating fluid.

4. A pump according to claim 3 including an exterior crossover pipe interconnecting the outlet means of said first heater plate and the inlet means of said second heater plate.

5. A pump according to claim 1 in which each of said heater plates comprises wall structure defining conduit means for a heating fluid.

6. A pump according to claim 5 in which the conduit means of said first heater plate is in communication with the conduit of said second heater plate.

7. A pump according to claim 1 wherein said first and second heater plates are provided with aligned bores, and further including sleeve means disposed in said bores, and a drive shaft rotatably disposed in said sleeve means and having one of said intermeshing gears mounted thereon for rotation therewith.

8. A pump according to claim 7 wherein said first and second heater plates are provided with aligned bores in which is fixed an arbor, and another of said intermeshing gears is rotatably mounted on said arbor.

9. A pump according to claim 8 having only two intermeshing gears disposed in said chamber.

10. A pump according to claim 9 wherein said first and second heater plates have flat side surfaces engaging flat side surfaces of said center plate and flat side surfaces of said front and back plates respectively, and said means urging said front and back plates toward each other comprises a plurality of screw members extending from said first plate to said rear plate via holes in said center plate and said heater plates.

11. A gear-type pump for bulk thermoplastic material in fluid form, said pump comprising:
   a front plate having first and second opposite side surfaces and inlet and outlet conduits for passage of thermoplastic material therethrough, said inlet and outlet conduits each extending between and terminating at said first and second opposite side surfaces;
   a first heater plate disposed parallel to said front plate, said first heater plate having opposite side surfaces and inlet and outlet conduits extending between its said side surfaces in aligned and communicating relation with said front plate inlet and outlet conduits respectively;
   a second heater plate disposed parallel to said first heater plate;
   a center plate disposed parallel to and between said first and second heater plates, said center plate having a hole therein defining a portion of a chamber which communicates with the inlet and outlet conduits respectively of said first heater plate;
   a pair of intermeshing gears disposed in said chamber and adapted to receive said material introduced to said chamber via the inlet conduit of said first heater plate and discharge said material out of said chamber via the outlet conduit of said first heater plate, said gears being disposed for rotation on axes extending at a right angle to the plane of said center plate;
   a back plate disposed parallel to said second heater plate;
   said front plate, first heater plate, center plate, second heater plate and back plate being disposed in a stack in the order named; and
   means urging said front and back plates toward each other so as to clamp said heater plates and said center plate therebetween in fluid sealing relation to one another;
   said heater plates being provided with means for providing heat to said plates, said gears and thermoplastic material in said chamber and said inlet and outlet conduits.

12. A pump according to claim 11 in which each of said heater plates comprises a substantially hollow plate having inlet and outlet means for a heating fluid.

13. A pump according to claim 11 wherein at least one of said heater plates comprises a lattice member open on both sides, and further including first and second side plates disposed on either side of and clamped to said lattice member so as to form a channel for circulating a heating fluid, said lattice member having means defining an inlet and outlet for said channel.

14. A pump according to claim 11 wherein each of said heater plates comprise a lattice member open at both sides, and further including first and second side plates disposed on either side of and clamped to each of said lattice members so as to form first and second channels for circulating a heating fluid, said heater plates having means defining an inlet and outlet for each of said channels.

15. A pump according to claim 11 wherein at least one of said heater plates comprises a single side wall and wall structure upstanding from said side wall, and further including a single side plate disposed on the free edges of said upstanding wall structure and cooperating with said wall structure to form a channel for heating fluid between said single side wall and said side plate, said at least one heater plate also having means defining an inlet and outlet means for said channel.

16. A pump according to claim 15 wherein each of said first and second heater plates comprises a single side wall and wall structure upstanding from said side wall, and further including a single side plate disposed on the free edges of the said upstanding wall structure of each of said heater plates and cooperating therewith to form a channel for heating fluid, said heater plates also having means defining an inlet and outlet for said channels.

17. A pump according to claim 16 wherein said first and second heater plates are provided with aligned bores, and further including sleeve means disposed in said bores, a drive shaft rotatably disposed in said sleeve means and having one of said gears mounted thereon for rotation therewith, additional aligned bores in said first and second heater plates, and an arbon fixed in said additional aligned bores, the other of said gears being rotatably mounted on said arbor.

* * * * *